United States Patent
Gedikian (10) Patent No.: US 10,111,030 B2
(45) Date of Patent: Oct. 23, 2018

(54) BEACON APPLICATIONS FOR CONTENT DISCOVERY AND INTERACTION

(71) Applicant: Apple Inc., Cupertino, CA (US)

(72) Inventor: Steve S. Gedikian, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 14/500,028

(22) Filed: Sep. 29, 2014

(65) Prior Publication Data

US 2016/0094598 A1  Mar. 31, 2016

(51) Int. Cl.
- *H04W 24/00* (2009.01)
- *H04W 4/021* (2018.01)
- *H04L 29/06* (2006.01)
- *H04W 4/14* (2009.01)

(52) U.S. Cl.
CPC ......... *H04W 4/021* (2013.01); *H04L 65/4076* (2013.01); *H04W 4/14* (2013.01)

(58) Field of Classification Search
CPC .............................. H04W 4/021; H04W 4/14
USPC ..................... 455/456.3, 414.1, 414.2, 414.3
See application file for complete search history.

(56) References Cited

U.S. PATENT DOCUMENTS

| | | | |
|---|---|---|---|
| 7,397,424 B2 | 7/2008 | Houri | |
| 7,460,503 B2 * | 12/2008 | Young | H04J 3/0602 370/331 |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,478,297 B2 | 7/2013 | Morgan et al. | |
| 8,752,086 B2 | 6/2014 | Conant | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 2003/0065806 A1 * | 4/2003 | Thomason | H04N 5/775 709/231 |
| 2009/0049090 A1 | 2/2009 | Shenfield et al. | |
| 2012/0064855 A1 | 3/2012 | Mendelson | |
| 2014/0026159 A1 * | 1/2014 | Cuttner | G06Q 30/0241 725/19 |
| 2014/0088975 A1 | 3/2014 | Davis et al. | |
| 2014/0143060 A1 | 5/2014 | Fernandez | |

(Continued)

OTHER PUBLICATIONS

U.S. Appl. No. 14/288,308, filed May 27, 2014, Centralized Beacon Management Service, Mayor.

(Continued)

*Primary Examiner* — Chuck Huynh (74) *Attorney, Agent, or Firm* — Fish & Richardson P.C.

(57) ABSTRACT

Beacon applications for content discovery and interaction include triggering features in applications, application discovery, embedding beacon information in streaming media, synchronizing the presentation of content on mobile devices and automatic configuration of mobile devices.

20 Claims, 7 Drawing Sheets

(56) References Cited

U.S. PATENT DOCUMENTS

2014/0220883 A1* 8/2014 Emigh ............... H04H 20/61
455/3.01

OTHER PUBLICATIONS

U.S. Appl. No. 13/905,552, filed May 30, 2013, Range Class Estimation for Radio Frequency Devices, Marti et al.
Nikoletic, Mileta. "Recommender Systems—A Smarter Shopping Solution". Published Oct. 2014. Retrieved on Sep. 25, 2014. Retrieved from the Internet: URL<http://milnik.net/wp-content/uploads/2013/10/Recommender-systems-for-smarter-shopping-solutions.pdf>. 9 pages.

* cited by examiner

BEACON APPLICATIONS FOR CONTENT DISCOVERY AND INTERACTION

TECHNICAL FIELD

This disclosure relates generally to radio frequency (RF) beacon technology and services.

BACKGROUND

Bluetooth® low energy (BLE) (also referred to as Bluetooth® Smart) is a wireless personal area network (PAN) technology that can be used for a variety of client device applications and is intended to provide reduced power consumption and cost while maintaining a similar communication range as Bluetooth®. Many mobile operating systems for smart phones, tablet computers and wearable devices support Bluetooth® Smart. The technical specifications for BLE are described in Bluetooth® Core Specification 4.0, which is a public document made available online by Bluetooth® Special Interest Group (SIG).

One potential application provided by BLE technology is proximity sensing. BLE beacons broadcast a Universally Unique Identifier (UUID), which can be detected by a compatible application or operating system running on a client device and used to determine the physical location of the client device or trigger an action on the client device.

SUMMARY

Beacon applications for content discovery and interaction include triggering features in applications, application discovery, embedding beacon information in streaming media, synchronizing the presentation of content on mobile devices and automatic configuration of mobile devices.

In some implementations, a method comprises: receiving, by a device, streaming media; obtaining, by the device, beacon information embedded in the streaming media, the beacon information including at least a beacon identifier and a content identifier, the beacon identifier identifying a radio frequency beacon in the environment; broadcasting, by the device, the streaming media into the environment; and concurrently with the broadcasting of the streaming media, broadcasting, by the radio frequency beacon, the beacon information into the environment.

In some implementations, a method comprises: receiving, by a device, beacon information broadcast from a radio frequency beacon into an environment, the beacon information obtained from streaming media that is broadcast into the environment concurrently with the beacon information, the beacon information including at least a beacon identifier identifying the radio frequency beacon and a content identifier identifying the streaming media; displaying a text message on a display of the device, where the text message is associated with the received beacon information; receiving, by the device, user input related to the text message, the user input requesting delivery of content associated with the received beacon information; sending, by the device, a request for the content to a content provider, the request including the beacon identifier and the content identifier; and receiving, by the device, access to the requested content.

In some implementations, a method comprises: receiving, by a server computer configured for delivering content, a request for content from a client device in communication with the server computer, the request including a beacon identifier and a content identifier, the beacon identifier identifying a radio frequency beacon in an environment and the content identifier identifying streaming media broadcast into the environment; identifying, by the server computer, a location of the streaming media broadcast based on the beacon identifier; identifying, by the server computer, the streaming media based on the content identifier; aggregating, by the server computer, additional content based on the identified location and streaming media; combining, by the server computer, the requested content and additional content; and providing, by the server computer, the client device access to the combined content.

In some implementations, a method comprises: receiving, by a master device, information obtained from content presented on the master device, the information including a synchronization signal associated with the presentation of the content on the master device; and broadcasting, by the master device, the synchronization signal.

In some implementations, a method comprises: receiving, by a slave device over a wireless communication link, information obtained from content presented on a master device, the information including a synchronization signal associated with the presentation of the content on a master display device; and changing, by the slave device, the presentation of the content on a slave display device based on the synchronization signal.

In some implementations, a method comprises: receiving, by a mobile device operating in an environment, beacon information broadcast from a radio frequency beacon in the environment, the beacon information including a link to configuration data for the mobile device; and retrieving, by the mobile device, the configuration data; and configuring the mobile device according to the configuration data.

Other implementations are directed to systems, apparatuses and non-transitory, computer-readable storage mediums. Particular implementations disclosed herein provide one or more of the following advantages. The beacon applications for content discovery and interaction disclosed herein allow client devices to discover new content associated with an environment or event occurring in the environment, and allow the users of the client devices to interact with the content on the client devices. Content providers can use beacon applications to target content (e.g., advertising) to the users of the client devices.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Centralized Beacon Management System

Figure 1:
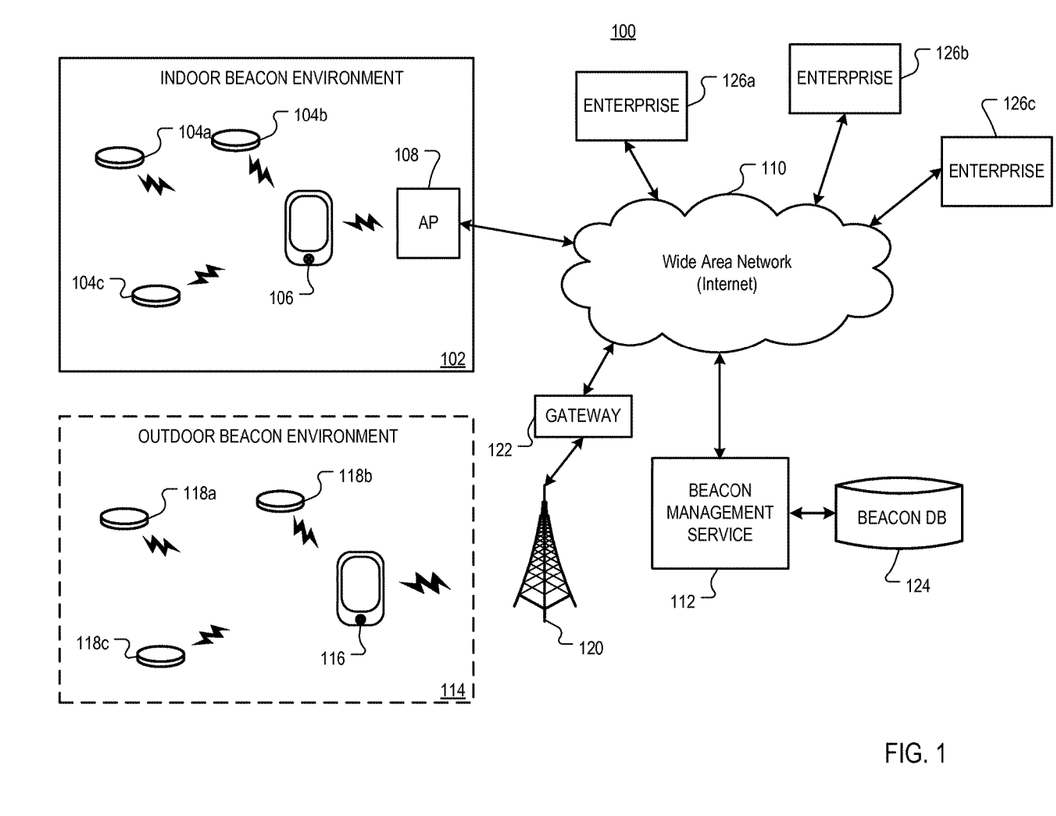
FIG. 1 illustrates an example centralized beacon management system that includes a centralized beacon management service that provides beacon applications for content discovery and interaction.

FIG. 1 illustrates an example centralized beacon management system 100 that includes a centralized beacon management service 112. Beacon management service 112 manages beacons for a plurality of enterprises 126a-126c at various indoor or outdoor locations 102, 114 (hereafter referred to as "beacon environments"). Generally, a beacon environment is any indoor or outdoor environment where at least one beacon is deployed. Beacon environments 102, 114 can include but are not limited to: retail stores, mass transit stations, museums, exhibitions, tradeshows, festivals, parking lots and structures, sporting and entertainment venues, airports, hospitals, libraries, restaurants, bars, movie theatres, etc. An "enterprise" as defined herein is any entity that deploys at least one beacon at a geographic location, including but not limited to: businesses, companies, firms, public/private organizations, government agencies/institutions, etc. Enterprises can be content providers, providing a variety of content such as text (e.g., advertising), audio (e.g., songs, albums), video, digital photographs, graphics, animations and the like.

In some implementations, beacon management service 112 communicates with enterprises 126a-126c through network 110 (e.g., the Internet). Beacon management service 112 can be implemented using one or more server computers. At least one server computer can deliver web pages for a beacon management portal that can be accessed by authorized enterprise personnel or administrators using a browser running on an administrator computer, as described in co-pending U.S. patent application Ser. No. 14/288,308, for "Centralized Beacon Management Service," filed May 27, 2014, which patent application is incorporated by reference herein in its entirety. Beacon management service 112 can access beacon database 124, which is configured to store beacon information.

Client device 106 operating in beacon environment 102 communicates wirelessly with beacon management service 112 through access point (AP) 108 (e.g., WiFi access point) and network 110. Client device 106 includes a wireless transceiver that can detect radio frequency (RF) signals broadcast from beacons 104a-104c when client device 106 is within communication range of beacons 104a-104c. In the example shown, beacon environment 102 is an indoor environment (e.g., a retail chain store).

Client device 116 operating in beacon environment 114 communicates wirelessly with beacon management service 112 through cell tower 120, gateway 122 and network 110. Client device 116 includes a wireless transceiver that can detect RF signals broadcast from beacons 118a-118c when client device 116 is within communication range of beacons 118a-118c. In the example shown, beacon environment 114 is an outdoor environment (e.g., a musical festival).

Beacons 104, 118 can be BLE beacons that comply with Bluetooth Core Specification 4.0 (hereafter referred to as the "BT Specification"). Any desired number of beacons can be deployed in beacon environments 102, 114. For example, beacons can be deployed in a retail store at an entrance, section (e.g., electronics section) and display (e.g., cell phone display).

In some implementations, beacons 104, 118 broadcast advertising packets that include headers that can be detected by client devices 106, 116 when configured to run in scan mode. When a beacon wants to broadcast, it starts an advertising event, where the same advertising packet is transmitted sequentially on each of three advertising channels as defined in the BT Specification. There are four different types of advertising packets defined by the BT Specification: non-connectable advertising, discoverable advertising, general advertising and directed advertising. For beacons broadcasting non-connectable advertising packets, the beacon transmits a string of data but does not respond to a request from a client device to make a secure connection. The string can include a resource locator (e.g., a Uniform Resource Locator (URL)) directing a browser running on the client device to a secondary online source of information, such as a website accessible by cellular or WiFi communication links.

An example BLE protocol for proximity sensing is iBeacon® protocol developed by Apple Inc. (Cupertino, Calif.). iBeacon® protocol specifies data elements or identifiers that can be programmed by users. iBeacon® allows client devices 106, 116 to scan and detect advertising packets from an iBeacon® as a background process. Once an application is installed on the client device, it can remain dormant until an appropriate iBeacon® is discovered. Advertising packets can be filtered and directed to specific applications installed on the client device or used to initiate actions on the client device with or without user intervention.

Beacon database 124 provides a centralized data store for enterprises to store their proprietary beacon information. Beacon database 124 can be a single database or a distributed database. Beacon database 124 can be a relational database that includes database tables. Beacon database 124 can include a database management system (DBMS) and schema that allows multiple enterprises to store and access beacon information for beacons used in their respective beacon environments.

In some implementations, each enterprise can be assigned one or more database tables that can be accessed through a beacon manager portal provided by beacon management service 112. As previously described, the enterprise can read and write beacon information to its database tables using the portal or a data feed. Beacon information can include any information related to the commissioning and operation of beacons, including but not limited to: proximity ID, major, minor, transmitted signal strength, packet type, packet payload data, device filter (e.g., white list), advertising event timing or any other information or content.

Beacon Applications for Content Discovery and Interaction

In some implementations, beacons 104, 118 broadcast beacon information to client devices 106, 116 when client devices 106, 116 are operating in beacon environments 102, 114. The beacon information can include content that is relevant to beacon environments 102, 114 and/or an event associated with beacon environments 102, 114. In some implementations, beacons 104, 118 can be used to trigger notifications that activate features of an application that is running on client devices 106, 116.

For example, client device 106 can be operating in a retail store and running a shopping application related to the retail store. When a beacon broadcast is received by client device 106, an advertising page with coupons and/or other information (e.g., a map) can be presented on a display of client device 106.

In another example application, in response to receipt of a beacon broadcast a social application running on client device 106 can prompt a user of client device 106 (e.g., using a text notification) to "check-in" with their social network.

In yet another example application, in response to receipt of a beacon broadcast, a concert application running on client device 106 operating at a concert venue can display a map of the concert venue.

In some implementations, if an application is not installed on client device 106, the beacon information can include a resource locator or link (e.g., web address) to a content provider's online store or web site where the application can be downloaded from one or more server computers to client device 106. The link (e.g., a URL) can include information that directs a browser application running on client device 106 to a specific content page related to the beacon environment. For example, a user at a concert venue can be directed to an "artist page" of an online music store for an artist performing at the concert venue.

In another example application, a user of client device 106 in a movie theatre can be directed by beacon information (e.g., resource locator included in the beacon information) to a content provider (e.g., ticket broker website) where the user can use client device 106 to pre-order tickets for a movie after watching the movie trailer in the theatre. The beacon information can also prompt the user of client device 106 (e.g., with a text notification, vibration) to place client device 106 in silent mode (e.g., "airplane mode") when the feature presentation begins.

In yet another example application, a user at a book reading event or book club meeting can be directed by beacon information to a content provider (e.g., book store website) where the user can purchase a copy of a book and other information related to the book or author.

In some implementations, beacon management service 112 can include a push notification service for pushing notifications to client devices 106, 116 in response to trigger events. The trigger event can be a beacon discovery or interaction by the client device. For example, when the trigger event occurs, the beacon (if operating in bi-directional communication mode) or the client device through a different communication channel (e.g., WiFi, cellular service) can send beacon proximity event data to the push notification service. Upon receipt of the beacon proximity event data, the push notification service can send a text message to the client device that includes a link to content and/or informs the user of the client device that an application related to the beacon environment is available. The trigger event could be, for example, detection of a broadcast signal from a beacon by a client device.

In some implementations, client devices 106, 116 can determine their estimated range from a given beacon based on a received signal strength indicator (RSSI), as described in co-pending U.S. patent application Ser. No. 13/905,552, for "Range Class Estimation for Radio Frequency Devices," filed May 30, 2013, which patent application is incorporated by reference herein in its entirety. The type of notification and/or content sent to the client device in response to a trigger event may be different based on the estimated range class (e.g., Immediate, Near, Far) determined by the client device.

Streaming Media with Embedded Beacon Information

Figure 2:
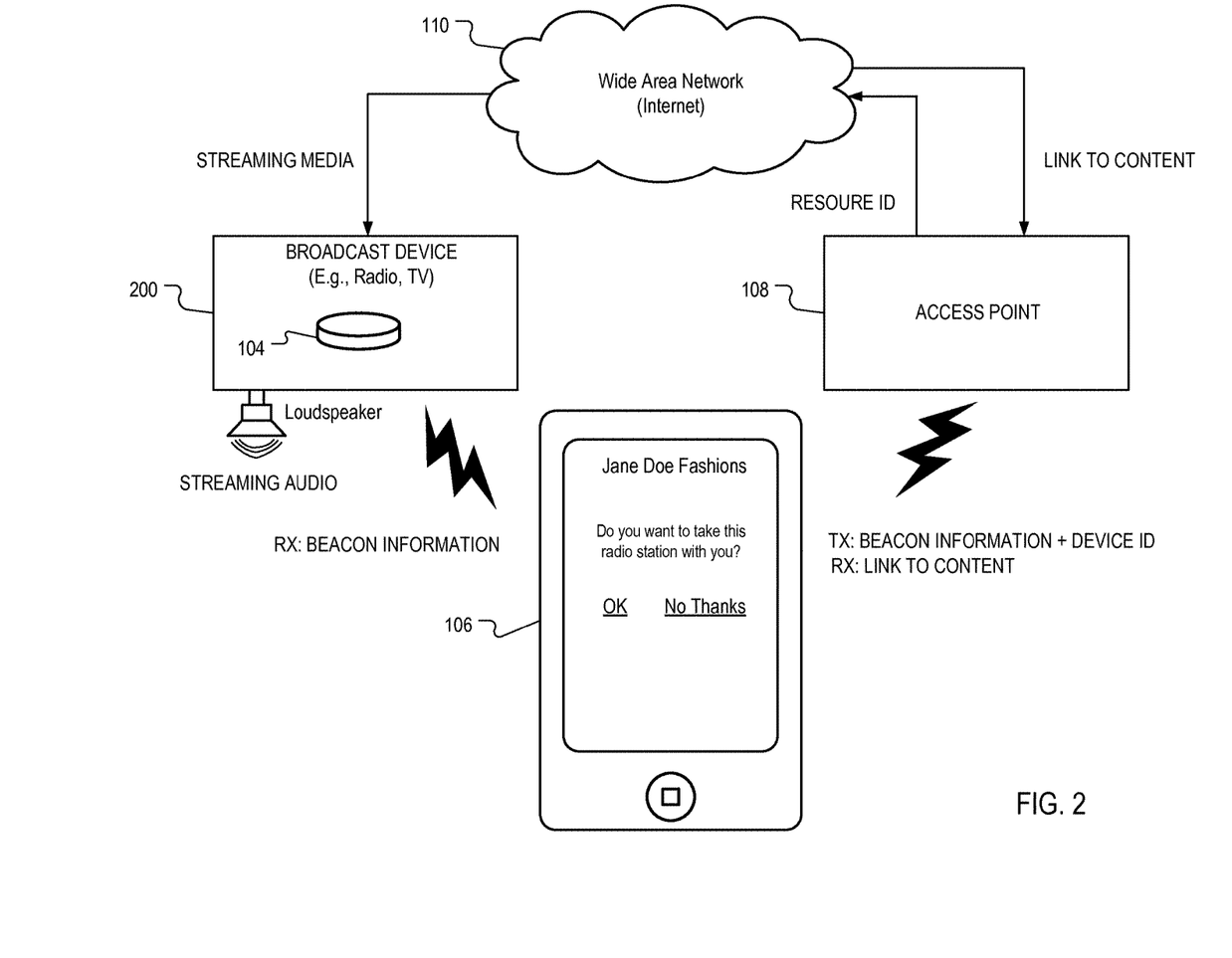
FIG. 2 illustrates broadcasting beacon information through broadcast devices to facilitate content discovery and interaction.

FIG. 2 illustrates broadcasting beacon information through broadcast devices to facilitate content discovery and interaction. In some implementations, broadcast device 200 includes (or is coupled to) beacon 104 (e.g., a BLE beacon) and is configured to broadcast streaming media concurrently with embedded beacon information. The streaming media and embedded beacon information can be received by client device 106 through network 110 (e.g., the Internet). Broadcast device 200 can be located in a variety of beacon environments, including but not limited to: retail stores, malls, restaurants, mass transit stations, airports, movie theatres, museums, theme parks, sporting events, concerts, or any other private or public venue, forum or location where users may be subjected to broadcast. Broadcast devices can include but are not limited to: computers, smart phones, tablet computers, media players, stereo systems, television devices and any other hardware device that can broadcast content into an environment using, for example, a loudspeaker system and/or screen or display (e.g., computer or television screen).

Embedding beacon information into streaming media allows content providers to, for example, localize the content and target advertising to users. A content provider can select beacon information for broadcast based on the geographic known location of the beacon, the streaming media being broadcast and the type of broadcast device (e.g., radio, TV, digital media player, computer). The beacon information can include a beacon identifier (e.g., UUID) to identify the location of the broadcast and a content ID to identify the specific content being broadcast (e.g., identify a specific song, movie soundtrack, video). A device ID stored by client device 106 can identify the type of client device receiving the broadcast (e.g., smart phone, tablet computer, media player, wearable device). With the beacon ID, content ID, device ID and a timestamp, a content provider can better target additional content to the user.

In the example shown, client device 106 can receive the streaming media from broadcast device 200 (e.g., a loudspeaker) over a first broadcast medium (e.g., acoustic signal) and receive beacon information through RF beacon 104 over a second medium (e.g., radio frequency signal). For example, a radio broadcast can be played through a loudspeaker (acoustic signal) embedded in, or coupled to, broadcast device 200 (e.g., Internet Radio). In some implementations, the content stream can be received as a packet stream from the Internet and the beacon information can be included in a packet header or payload. Once the beacon information is obtained (e.g., decoded) by broadcast device 200, broadcast device 200 can broadcast the beacon information through beacon 104 (radio frequency signal) where it can be received by client device 106, and, concurrently with the broadcast of the beacon information, broadcast the streaming media into the beacon environment where it can be heard or viewed by the user of client device 106.

Example Application—Retail Chain Store

In an example retail chain store application, broadcast device 200 (e.g., a stereo system) in beacon environment 102 (e.g., a retail store) can broadcast a branded Internet radio station over a loudspeaker system for the benefit of its shoppers. Client device 106 in the retail store can also receive beacon information from beacon 104 embedded in, or coupled to, broadcast device 200. The beacon information can include a beacon ID that can be used by a backend system (e.g., beacon management service 112 or a store computer system) to identify a location of client device 106, such as a particular store in the retail chain, time of day and a content ID to identify the branded Internet radio station being played (and/or the song being played). A device ID stored in client device 106 can identify the client device type (e.g., a smart phone, tablet computer, wearable device).

In this example use case, the beacon information can include a text message that is presented to the user on a screen and/or through audio output of client device 106: "Do you want to take this radio station home with you?" A link or other suitable mechanism can also be provided with the text that, when selected by the user of client device 106, provides one or more of activating an application or application feature on client device 106, discovering an application for download on client device 106 or directing client device 106 to a content provider to receive additional content.

If the user of client device 106 accepts the offer (e.g., by clicking the "OK" link), the beacon information (beacon ID, content ID, timestamp) and device ID (obtained from memory in client device 106) is sent to the content provider through wireless AP 108 (or a cell tower) and network 110.

At the content provider, one or more server computers can use the beacon information to select, aggregate and format content to send to client device 106. For example, the beacon ID and timestamp can be used to identify a broadcast location and event (e.g., a sales event) and the content ID can be used to identify a possible demographic of the user.

To further illustrate the use of embedded beacon information in content streams, a use scenario in a fictitious women's clothing store called "Jane Doe Fashions" will now be described. In this use scenario, a customer is shopping at Jane Doe Fashions in Palo Alto, Calif. She has her mobile phone turned on and she has opted-in to receiving location services. She is also running the Jane Doe Fashions shopping application that she downloaded earlier from an online application store. A stereo system in the store is playing a "Jane Doe Fashions" branded Internet radio station through loudspeakers. The branded Internet radio station is provided by a radio streaming service (e.g., Apple Inc.'s iRadio®). The branded radio station plays songs that Jane Doe Fashions selected as being appropriate for their customer demographic. The radio content stream includes embedded beacon information, such as a resource locator, beacon ID, content ID and text message. The beacon information is decoded from the content stream and broadcast from a beacon that is embedded in, or coupled to, the store stereo system.

The customer's smart phone discovers the beacon in the store and receives the beacon information, which is provided (e.g., by an operating system of the smart phone) to the shopping application running on the smart phone. The text message is displayed on the smart phone with a link for accepting the offer: "Would you like to take this radio station with you?" If the customer accepts the offer, the shopping application uses the resource locator to send the beacon ID, content ID and a device ID stored on the smart phone to the radio streaming service. At the streaming service, the beacon ID is used to identify the store location (Palo Alto, Calif.) and the content ID is used to identify the branded radio station (Jane Doe Fashions). The device ID identifies the client device as a smart phone. No personal information is sent to the radio streaming service. In some implementations, the beacon information can be encrypted or otherwise made anonymous on the smart phone prior to sending to the radio streaming service.

Upon receipt of the information from the smart phone, the radio streaming service aggregates audio advertisements stored in a database that are localized to the specific store and targets the demographic of the typical store customer. The audio advertisements are added to the branded radio station to be broadcast between songs. A link to the branded radio station is then sent to the client device so that the user can play the radio station on their smart phone after they leave the store. In some implementations, the targeted advertisements are formatted for the particular device type (e.g., smart phone) identified by the device ID. For example, an Internet radio station for a media player may be formatted differently than an Internet radio station for a smart phone, tablet computer or wearable device, as each device may use, for example, a different audio codec. If the content is visual, then the device ID can be used to determine display screen size and resolution.

In some implementations, content providers can embed the beacon information in the streaming media. However, in some situations this may not be possible. An alternate implementation is to have the broadcast device (e.g., a radio or computer) capture a signature (e.g., audio fingerprint) of the streaming media and identify the streaming media by matching the signature to a reference signature in a reference database. After the streaming media is identified by the signature match, the broadcast device can generate a content ID for the streaming media and broadcast the content ID with the beacon ID to client devices.

Example Application—Movie Theatre

In this example application, beacons are deployed in a movie theatre to broadcast beacon information during the screening of a movie trailer or slide show. For movie trailers, beacon information identifying the movie trailer is broadcast by theatre beacons so that it can be received by client devices in the movie theatre while the movie trailer is playing. A text message and link is presented on the client device to direct the user of the client device to additional content related to the movie trailer. For example, the additional content could be a link to the movie trailer and/or additional information (e.g., about the movie, cast, director) or a ticket broker where the user can pre-order tickets for the movie. In some implementations, just before the feature presentation begins, the movie theatre beacons can broadcast a text message requesting the users to turn off their client devices so as not to disturb the other patrons during the movie.

Slideshows with advertisements are often played in movie theatres. For each slide in the slide show, a content ID can be broadcast from the theatre beacons. A content ID for a slide can be used to drive the client device to the advertiser's website or other designated resource associated with the slide. In some implementations, a list of links for the entire slide show is sent to the client device, so that the user can browse the content at a later time. In some cases, the client device can receive an electronic coupon for use at the movie concession stand as incentive for requesting the trailers or other offers.

The content discovery and interaction in a movie theatre described above is applicable to any event where beacons can be deployed and content streams are broadcast, including but not limited to: concert venues, sporting events, museums, trade shows, airport, hotel lobbies, mass transit stations, schools, etc.

Example Processes

Figure 3:
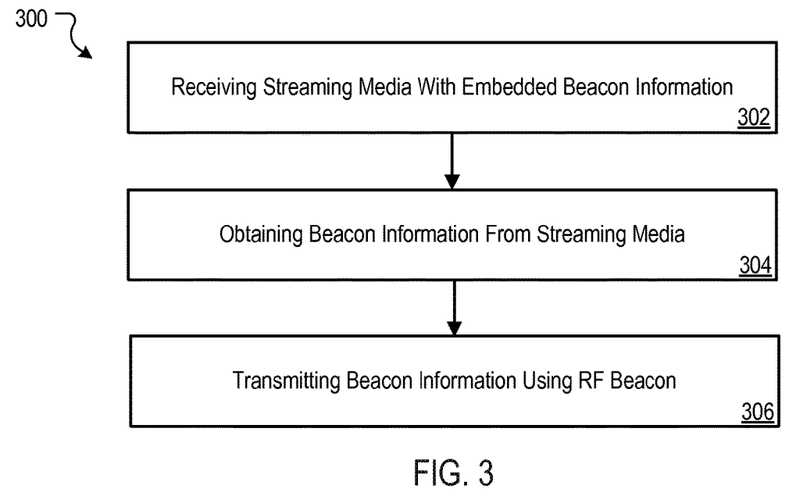
FIG. 3 is a flow diagram of an example process performed by a broadcast device.

FIG. 3 is a flow diagram of an example process 300 performed by a broadcast device. Process 300 can be implemented using one of the architectures described in reference to FIGS. 9 and 10.

In some implementations process 300 can begin by receiving streaming media (e.g. audio, video) with embedded beacon information (302). The beacon information can be included in a packet header and/or payload. The beacon information can include a content ID, beacon ID and timestamp for identifying the streaming media and the location and time of the broadcast. Process 300 can continue by decoding the beacon information from the streaming media (304) and broadcasting the beacon information using an RF beacon embedded in, or coupled to, the broadcast device (306). The beacon information can be broadcast over a first broadcast medium (e.g., acoustic signals) concurrently with the broadcasting of the streaming media over a second broadcast medium (e.g., RF signals). In some implementations, the broadcast device can be configured to identify the streaming media (e.g., based on an audio signature) and to generate a content ID identifying the streaming media. In some implementations, the broadcast device can be configured over a network connection by a centralized beacon management service (e.g., centralized beacon management service 112).

Figure 4:
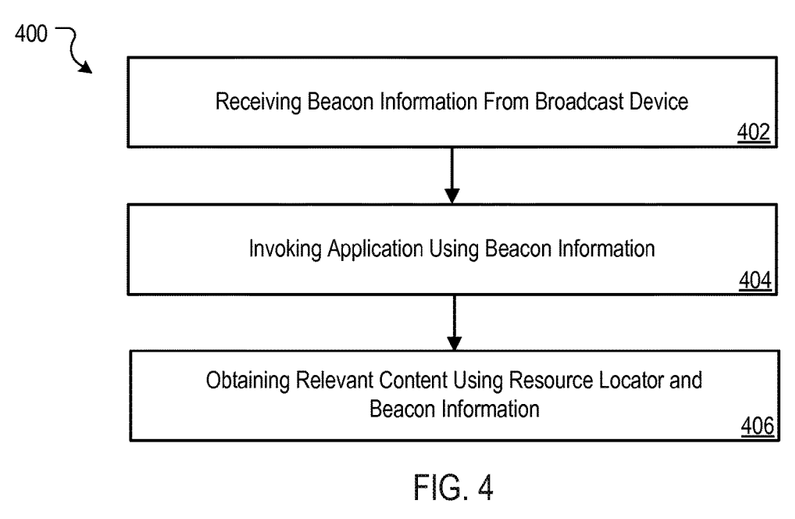
FIG. 4 is a flow diagram of an example process performed by a client device.

FIG. 4 is a flow diagram of an example process 400 performed by a client device. Process 400 can be implemented using the client architecture described in reference to FIG. 9.

In some implementations, process 400 can begin by receiving beacon information from a broadcast device (402). The beacon information can include a resource locator, content ID, beacon ID and timestamp.

Process 400 can continue by invoking an application or a feature of an application using the beacon information (404). The resource locator (e.g., URL or web address) can be used by a browser or other application running on the client device to direct the browser to a website or online store of a content provider to obtain relevant content using the beacon information (406). If the application is installed on the client device but is not running, receipt of the beacon information can be used to invoke or launch the application on the client device. If the application is not installed on the client device, then the resource locator (or a different resource locator) can be used to download the application from the website or online store.

Process 400 can continue by receiving content from the content provider that is related to the beacon environment and presenting or playing (e.g., using a digital media player) the content on the client device. The content can be downloaded automatically (pushed) to the client device or downloaded in response to user input. In the latter case, the user may have navigated through the content on the website or online store and selected a particular content to download to the client device.

In some implementations, the content includes a link to a social network (e.g., Facebook® "Like" button) that can be used to share the content with friends. This social network feature assists content providers in finding additional potential customers as a user's social network is likely to enjoy the same content as the user, and therefore would likely be receptive to receiving a link to the content.

Figure 5:
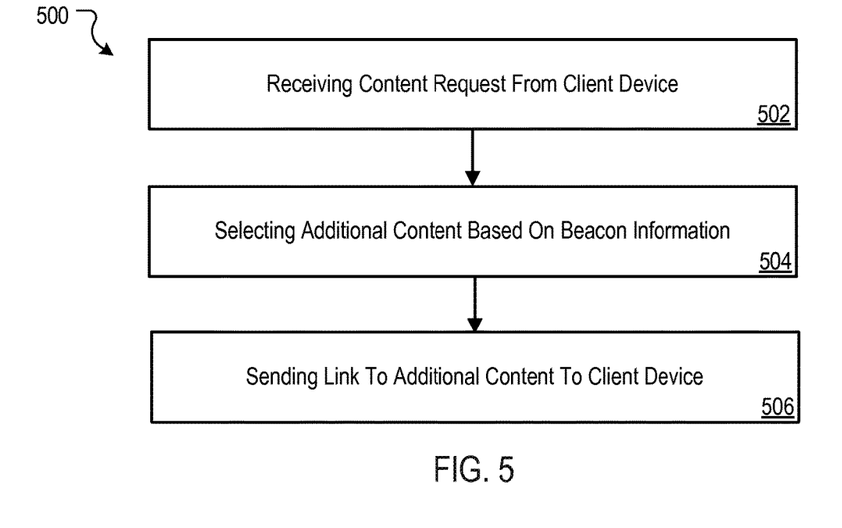
FIG. 5 is a flow diagram of an example process performed by a content provider server computer.

FIG. 5 is a flow diagram of an example process 500 performed by a server computer of a content provider. Process 500 can be implemented using the server computer architecture described in reference to FIG. 10.

In some implementations, process 500 can begin by receiving a content request from a client device (502). The content request can include beacon information and a device ID for identifying the location and time of a broadcast of streaming media, the streaming media that was broadcast and the device type of the client device that received the beacon information (e.g., smart phone, tablet computer, wearable device).

Process 500 can continue by selecting, aggregating and formatting content based on the beacon information (504). For example, a beacon ID can be a UUID, which can be matched against a list of beacon IDs in a beacon database (e.g., beacon database 124) operated by the content provider. The beacon database (e.g., a relational database) associates the beacon ID with other information, such as the name of an enterprise providing the content and a location of the beacon (e.g., a store ID and/or location). For example, a specific beacon can be associated with a particular retail store of a retail chain and/or location in the store (e.g., the cosmetics section). The beacon information can be used to determine a possible demographic of the user operating the client device. The demographic can be used to select, aggregate and format targeted content (e.g., advertising) to insert in or add to the requested content. For example, if the content is a branded radio station, then audio commercials tailored to the user demographic can be inserted between songs in the playlist for the branded radio station. If the content is a video or television program, then an appropriate commercial tailored to the user demographic can be added to the video or television program.

After the content has been prepared, a link (resource locator) to the content can be sent to the client device, which, when selected by the user or the application, provides access to the aggregated content (506).

Synchronizing Content Presentations

Figure 6:
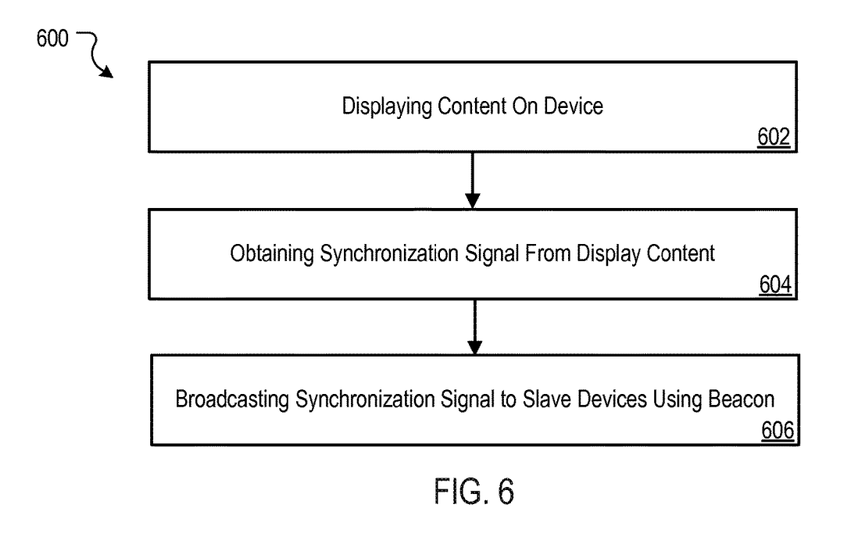
FIG. 6 is a flow diagram of an example process performed by a master device communicating with slave devices to synchronize the presentation of content on the slave devices.

FIG. 6 is a flow diagram of an example process 600 performed by a master device communicating with slave devices to synchronize the presentation of content on the slave devices. Process 600 can be implemented using the client architecture described in reference to FIG. 9.

In some implementations, process 600 displays content on a master device in communication with slave devices (602). Process 600 continues by obtaining a synchronization signal embedded in the displayed content (604). Process 600 continues by broadcasting the synchronization signal through an RF beacon installed in, or coupled to, the master device (606).

For example, the master device can be a computer or tablet computer with a wireless transceiver that is configured by software to behave like a beacon. In one example use scenario, the master device can be running an electronic book (e-book) reader application. Each time a user of the master device changes the page in a book, a page indicator signal is broadcast to slave devices in the vicinity of the master device. The page indicator signal indicates the current page that the master device is displaying so that book reader applications running on the slave devices (e.g., computers, tablet computers) can automatically change to the page in the book indicated by the page indicator.

The synchronization of content presentations can be used in classrooms, book readings and any other use scenario where a single device wants to synchronize the presentation of content with other devices operating in the same environment. In some implementations, a page indicator signal is embedded in the electronic book content (e.g., metadata). When the e-book page is rendered by the e-book reader on a display the page indicator is obtained (e.g., decoded) from the page content and broadcast by the master device to the slave devices using an RF beacon. In some implementations, the RF beacon can be a wireless transceiver in the master device that is used for Bluetooth communications.

Figure 7:
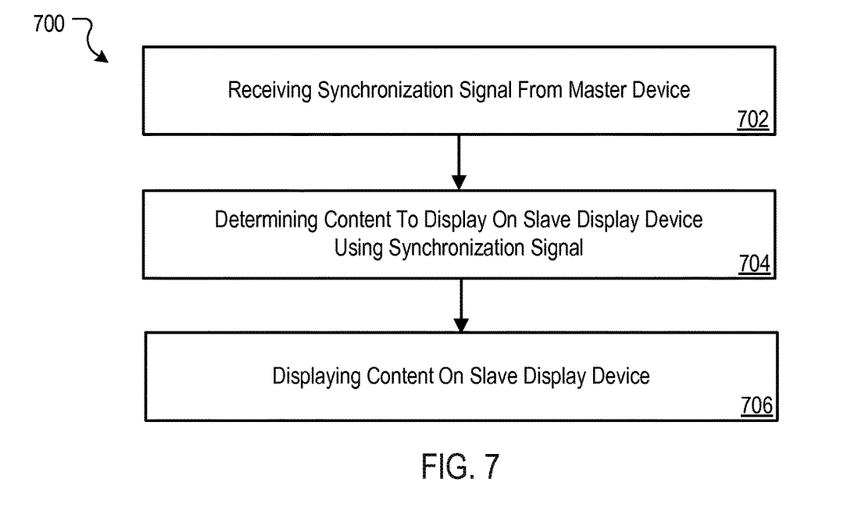
FIG. 7 is a flow diagram of an example process performed by slave devices communicating with a master device to synchronize the presentation of content on the slave devices.

FIG. 7 is a flow diagram of an example process 700 performed by slave devices communicating with a master device to synchronize the presentation of content on the slave devices. Process 700 can be implemented using the client architecture described in reference to FIG. 9.

In some implementations, process 700 can begin by the slave device receiving a synchronization signal from the master device (702). The slave device can be a computer, smart phone or tablet computer with a wireless transceiver that is configured by software to be controlled by a master device using broadcast signals. Process 700 can continue by determining content to display on the slave display device (704) and displaying the content on the slave display device (706).

Referring again to the book reading use scenario, when a user of the master device changes the page in an e-book, a page indicator signal is broadcast to slave devices in the vicinity of the master device or beacon environment. An e-book reader application running on the slave devices can use the page indicator to automatically display the same page as displayed on the master device, therefore synchronizing the display of content on the master and slave devices using RF beacons.

Mobile Device Management

In some implementations, centralized beacon management service 112 allows an information technology (IT) professional or other enterprise personnel to use a web portal for mobile device management across business units regardless of geographic locations. Client devices can be configured or re-configured based on beacon discovery and interaction. For example, an enterprise may deploy beacons in offices that broadcast beacon information that directs newly issued client devices (e.g., mobile phones, tablet computers) to an intranet page where the user can authenticate and/or configure their client device. In some implementations, the client devices can be configured differently or certain device functions or applications can be made inaccessible or restricted based on the office and the user's authorization status or security clearance. For example, beacon information can provide different welcome messages and instructions depending on the office. The client device can be directed by a resource locator or link in the beacon information to a local intranet page for the office, where the client device can be configured for the office and geographic region (e.g., localized to a specific language in the case of international corporations).

Figure 8:
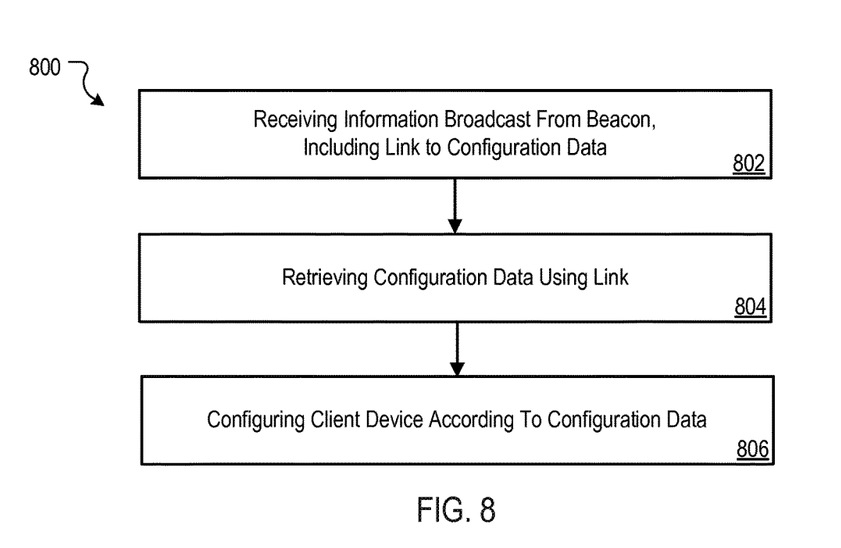
FIG. 8 is a flow diagram of an example mobile device management process performed by a client device to configure the client device.

FIG. 8 is a flow diagram of an example mobile device management process 800 performed by a client device to configure the client device. Process 800 can be implemented using the client architecture described in reference to FIG. 9.

Process 800 can begin by receiving information broadcast from a radio frequency beacon in an environment (e.g., office building), the information including a link to configuration data for the device (802). Process 800 can continue by retrieving the configuration data (804) and configuring the device according to the configuration data (806). Configuration data can include, for example, the setting of parameters for the client device operating system and installed applications. In some implementations, the client device is automatically configured without user intervention.

Example Client Architecture

Figure 9:
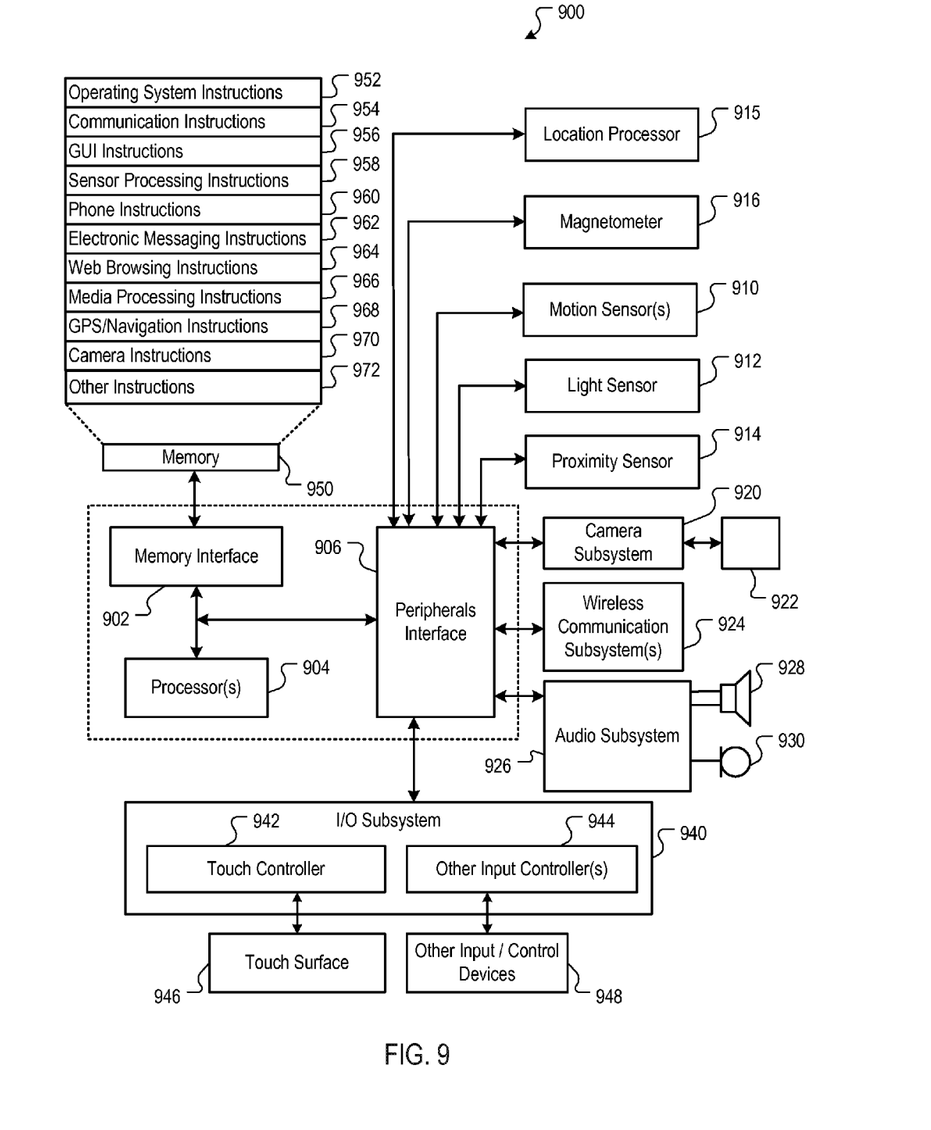
FIG. 9 is a block diagram of example client device architecture for implementing the features and processes described in reference to FIGS. 1-8.

FIG. 9 is a block diagram of example client device architecture 900 for implementing the features and processes described in reference to FIGS. 1-8. Architecture 900 may be implemented in any mobile device for implementing the features and processes described in reference to FIGS. 1-8, including but not limited to portable computers, smart phones and tablet computers, game consoles, wearable computers and the like. Architecture 900 may include memory interface 902, data processor(s), image processor(s) or central processing unit(s) 904, and peripherals interface 906. Memory interface 902, processor(s) 904 or peripherals interface 906 may be separate components or may be integrated in one or more integrated circuits. One or more communication buses or signal lines may couple the various components.

Sensors, devices, and subsystems may be coupled to peripherals interface 906 to facilitate multiple functionalities. For example, motion sensor 910, light sensor 912, and proximity sensor 914 may be coupled to peripherals interface 906 to facilitate orientation, lighting, and proximity functions of the device. For example, in some implementations, light sensor 912 may be utilized to facilitate adjusting the brightness of touch surface 946. In some implementations, motion sensor 910 (e.g., an accelerometer, gyros) may be utilized to detect movement and orientation of the device. Accordingly, display objects or media may be presented according to a detected orientation (e.g., portrait or landscape). Other sensors may also be connected to peripherals interface 906, such as a temperature sensor, a biometric sensor, or other sensing device, to facilitate related functionalities.

Location processor 915 (e.g., GPS receiver chip) may be connected to peripherals interface 906 to provide georeferencing. Electronic magnetometer 916 (e.g., an integrated circuit chip) may also be connected to peripherals interface 906 to provide data that may be used to determine the direction of magnetic North. Thus, electronic magnetometer 916 may be used with an electronic compass application.

Camera subsystem 920 and an optical sensor 922, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 924. Communication subsystem(s) 924 may include one or more wireless communication subsystems. Wireless communication subsystems 924 may include radio frequency receivers and transmitters and/or optical (e g, infrared) receivers and transmitters. Wired communication systems 924 may include a port, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 924 may depend on the communication network(s) or medium(s) over which the device is intended to operate. For example, a device may include wireless communication subsystems designed to operate using known or standardized protocols, including but not limited to: global system for mobile communications (GSM), GPRS, enhanced data GSM environment (EDGE), IEEE 802.x (e.g., WiFi, WiMax), code division multiple access (CDMA), Near Field Communications (NFC), Bluetooth® (including classic Bluetooth® and Bluetooth® low energy (BLE)). Wireless communication subsystems 924 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known or standardized protocol.

Audio subsystem 926 may be coupled to a speaker 928 and one or more microphones 930 to facilitate voice-enabled functions, such as voice recognition, voice replication, digital recording, and telephony functions.

I/O subsystem 940 may include touch controller 942 and/or other input controller(s) 944. Touch controller 942 may be coupled to a touch surface 946. Touch surface 946 and touch controller 942 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 946. In one implementation, touch surface 946 may display virtual or soft buttons and a virtual keyboard, which may be used as an input/output device by the user.

Other input controller(s) 944 may be coupled to other input/control devices 948, such as one or more buttons, rocker switches, thumb-wheel, infrared port, USB port, and/or a pointer device such as a stylus. The one or more buttons (not shown) may include an up/down button for volume control of speaker 928 and/or microphone 930.

In some implementations, device 900 may present recorded audio and/or video files, such as MP3, AAC, and MPEG video files. In some implementations, device 900 may include the functionality of an MP3 player and may include a pin connector for tethering to other devices. Other input/output and control devices may be used.

Memory interface 902 may be coupled to memory 950. Memory 950 may include high-speed random access memory or non-volatile memory, such as one or more magnetic disk storage devices, one or more optical storage devices, or flash memory (e.g., NAND, NOR). Memory 950 may store operating system 952, such as Darwin, RTXC, LINUX, UNIX, OS X, WINDOWS or an embedded operating system such as VxWorks. Operating system 952 may include instructions for handling basic system services and for performing hardware dependent tasks. In some implementations, operating system 952 may include a kernel (e.g., UNIX kernel).

Memory 950 may also store communication instructions 954 to facilitate communicating with one or more additional devices, one or more computers or servers, including peer-to-peer communications, as described in reference to FIGS. 1-8. Communication instructions 954 may also be used to select an operational mode or communication medium for use by the device, based on a geographic location (obtained by the GPS/Navigation instructions 968) of the device. Memory 950 may include graphical user interface instructions 956 to facilitate graphic user interface processing, including a touch model for interpreting touch inputs and gestures; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes; camera instructions 970 to facilitate camera-related processes and functions; and other instructions 972 for performing some or all of the client device or broadcast device processes, as described in reference to FIGS. 1-8.

Each of the above identified instructions and applications may correspond to a set of instructions for performing one or more functions described above. These instructions need not be implemented as separate software programs, procedures, or modules. Memory 950 may include additional instructions or fewer instructions. Furthermore, various functions of the device may be implemented in hardware and/or in software, including in one or more signal processing and/or application specific integrated circuits (ASICs).

Example Server Architecture

Figure 10:
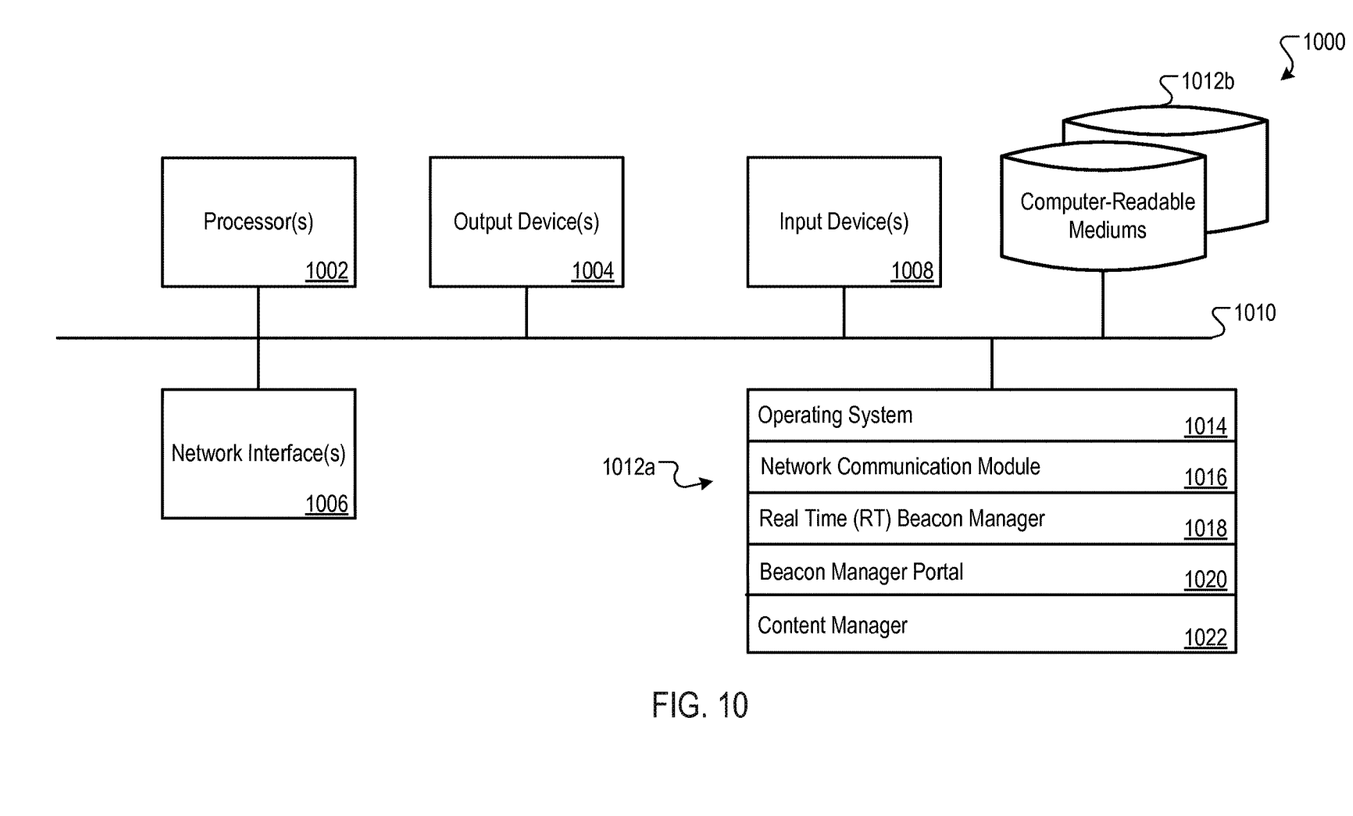
FIG. 10 is a block diagram of example server computer architecture for implementing the features and processes described in reference to FIGS. 1-8.

FIG. 10 is a block diagram of example server computer architecture 1000 of a content provider for implementing the server computer features and processes described in reference to FIGS. 1-8. Other architectures are possible, including architectures with more or fewer components. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012a (e.g., hard disk, optical disk) and 1012b (e.g., RAM, ROM, SDRAM, flash memory). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 1012a, 1012b can further include operating system 1014 (e.g., Mac OS® server, Windows® NT server), network communication module 1016, real time beacon manager module 1018, beacon manager portal module 1020 and content manager module 1022. Operating system 1014 can be multi-user, multiprocessing, multitasking, multithreading, real time, etc. Operating system 1014 performs basic tasks, including but not limited to: recognizing input from and providing output to devices 1004; keeping track and managing files and directories on computer-readable mediums 1012a, 1012a; controlling peripheral devices; and managing traffic on the one or more communication channels 1010. Network communications module 1016 includes various components for establishing and maintaining network connections (e.g., software for implementing communication protocols, such as TCP/IP, HTTP, etc.). Beacon manager module 1018 performs real time beacon commissioning and other beacon services. Beacon manager portal module 1020 provides a web portal to enterprises. Beacon manager portal module 1020 can also establish a web feed (e.g., XML feed) to beacon management service 112 from enterprise computer systems. Content manager 1020 module can select, aggregate and format content based on beacon information and a device ID, as described in reference to FIGS. 1-8.

Architecture 1000 can be included in any computer device, including one or more server computers each having one or more processing cores. Architecture 1000 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a broadcast device operating in an environment, streaming media from a network-based content provider, the broadcast device being coupled to a radio frequency beacon device in the environment, the streaming media including a content portion and beacon information, the beacon information including at least a beacon identifier and a content identifier, the beacon identifier identifying the radio frequency beacon device and a location of the environment or a location in the environment, wherein the beacon identifier, when received by the network-based content provider or other content provider from a device operating in the environment, is used to identify additional content to send to the device, wherein the additional content is identified at least in part by using the beacon identifier to look up in a database accessible by the networked-based content provider or other content provider, the location of the environment or the location in the environment;
   broadcasting, by the broadcast device, the content portion of the streaming media into the environment over a first broadcast medium; and
   concurrently with the broadcasting of the content portion of the streaming media, broadcasting, by the radio frequency beacon device, the beacon information into the environment over a second broadcast medium that is different than the first broadcast medium.

2. The method of claim 1, where obtaining the beacon information includes obtaining the beacon identifier and content identifier from a streaming media packet header.

3. The method of claim 1, where broadcasting the content portion of the streaming media includes playing the content portion of the streaming media through a loudspeaker.

4. The method of claim 1, where broadcasting the content portion of the streaming media includes displaying the content portion of the streaming media on a computer or television screen.

5. The method of claim 1, where the beacon information further includes a device identifier stored by the device, the device identifier identifying the broadcast device type.

6. The method of claim 5, where the device type is a stereo system and the content ID identifies a radio station provided by a radio streaming service.

7. The method of claim 5, where the device type is a television system and the content ID identifies a television station.

8. The method of claim 1, where the content ID is associated with a slide show being presented in the environment.

9. An apparatus comprising:
   one or more processors;
   memory coupled to the one or more processors and storing instructions, which, when executed by the one or more processors, causes the one or more processors to perform operations comprising:
   receiving streaming media from a network-based content provider, the streaming media including a content portion and beacon information, the beacon information including at least a beacon identifier and a content identifier, the beacon identifier identifying the radio frequency beacon device and a location of the environment or a location in the environment, wherein the beacon identifier, when received by the network-based content provider or other content provider from a device operating in the environment, is used to identify additional content to send to the device, wherein the additional content is identified at least in part by using the beacon identifier to look up in a database accessible by the networked-based content provider or other content provider, the location of the environment or the location in the environment;
   broadcasting the content portion of streaming media into the environment over a first broadcast medium; and
   concurrently with the broadcasting of the content portion of the streaming media, broadcasting, by the radio frequency beacon device, the beacon information into the environment over a second broadcast medium that is different than the first broadcast medium.

10. The apparatus of claim 9, where obtaining the beacon information includes obtaining the beacon identifier and content identifier from a streaming media packet header.

11. The apparatus of claim 9, where broadcasting the content portion of the streaming media includes playing the content portion of the streaming media through a loudspeaker.

12. The apparatus of claim 9, where broadcasting the content portion of the streaming media includes displaying the content portion of the streaming media on a computer or television screen.

13. The apparatus of claim 9, where the beacon information further includes an apparatus identifier stored by the apparatus, the apparatus identifier identifying the apparatus type.

14. The apparatus of claim 13, where the apparatus type is a stereo system and the content ID identifies a radio station provided by a radio streaming service.

15. The apparatus of claim 13, where the apparatus type is a television system and the content ID identifies a television station.

16. The apparatus of claim 9, where the content ID is associated with a slide show being presented in the environment.

17. A non-transitory, computer-readable storage medium having instructions stored thereon, which, when executed by one or more processors, causes the one or more processors to perform operations comprising:

receiving, by a broadcast device operating in an environment, streaming media from a network-based content provider, the broadcast device being coupled to a radio frequency beacon device in the environment, the streaming media including a content portion and beacon information, the beacon information including at least a beacon identifier and a content identifier, the beacon identifier identifying the radio frequency beacon device and a location of the environment or a location in the environment, wherein the beacon identifier, when received by the network-based content provider or other content provider from a device operating in the environment, is used to identify additional content to send to the device, wherein the additional content is identified at least in part by using the beacon identifier to look up in a database accessible by the networked-based content provider or other content provider, the location of the environment or the location in the environment;

broadcasting, by the broadcast device, the content portion of the streaming media into the environment over a first broadcast medium; and concurrently with the broadcasting of the content portion of the streaming media, broadcasting, by the radio frequency beacon device, the beacon information into the environment over a second broadcast medium that is different than the first broadcast medium.

18. The non-transitory, computer-readable storage medium of claim 17, where the beacon information further includes a device identifier stored by the broadcast device, the device identifier identifying the broadcast device type.

19. The non-transitory, computer-readable storage medium of claim 17, where the beacon information further includes a device identifier stored by the device, the device identifier identifying the broadcast device type.

20. The non-transitory, computer-readable storage medium of claim 17, where the device type is a stereo system and the content ID identifies a radio station provided by a radio streaming service.

* * * * *